(12) United States Patent
Jensen et al.

(10) Patent No.: US 10,102,572 B2
(45) Date of Patent: Oct. 16, 2018

(54) 24 HOURS GLOBAL LOW LATENCY COMPUTERIZED EXCHANGE SYSTEM

(75) Inventors: Daniel Jensen, Stockholm (SE); Urban Arvidsson, Kungsör (SE)

(73) Assignee: NASDAQ TECHNOLOGY AB, Stockholm (SE)

( * ) Notice: Subject to any disclaimer, the term of this patent is extended or adjusted under 35 U.S.C. 154(b) by 918 days.

(21) Appl. No.: 12/757,106

(22) Filed: Apr. 9, 2010

(65) Prior Publication Data
US 2010/0332371 A1 Dec. 30, 2010

Related U.S. Application Data

(60) Provisional application No. 61/221,302, filed on Jun. 29, 2009.

(51) Int. Cl.
| G06Q 40/04 | (2012.01) |
| H04L 12/18 | (2006.01) |
| H04L 12/58 | (2006.01) |

(52) U.S. Cl.
CPC ............ *G06Q 40/04* (2013.01); *H04L 12/18* (2013.01); *H04L 51/26* (2013.01)

(58) Field of Classification Search
CPC .................................................. G06F 11/1474
USPC .................................................. 705/36 R, 37
See application file for complete search history.

(56) References Cited

U.S. PATENT DOCUMENTS

| 5,596,706 A * | 1/1997 | Shimazaki et al. ............ 714/6.3 |
| 6,967,929 B1 * | 11/2005 | Taylor ........................... 370/252 |
| 2006/0190702 A1 * | 8/2006 | Harter et al. .................... 712/15 |
| 2006/0248373 A1 * | 11/2006 | Warman et al. .................. 714/4 |
| 2010/0191638 A1 * | 7/2010 | Alderucci et al. .............. 705/37 |

FOREIGN PATENT DOCUMENTS

WO        WO 01/98961        12/2001

OTHER PUBLICATIONS

Written Opinion and International Search Report of the International Searching Authority dated Sep. 9, 2010 in corresponding Application No. PCT/EP2010/057839.
Hauswirth et al; A Component and Communication Model for Push Systems, XP002598312, pp. 1-18, 1999.
"6.1.1 Reasons for Replication" In: Tanenbaum, A.S. et al., "Distributed Systems" 2002, XP002598307 ISBN: 0-13-121786-0, pp. 292-293.
Velpuri R; "OCP Oracle9i Database. Fundamentals II Exam Guide" 2002, XP002598308 ISBN: 0-07-219543-6, pp. 137-139.
Franklin, M. et al; "Transactional client-server cache consistency: alternatives and performance" ACM Transactions on Database Systems, ACM, New York, NY, US LNKD-DOI: 10.1145/261124. 261125, vol. 22, No. 3, Sep. 1, 1997, pp. 315-363, XP002247935 ISSN: 0362-5915.

(Continued)

*Primary Examiner* — Cho Kwong
(74) *Attorney, Agent, or Firm* — Nixon & Vanderhye, P.C.

(57) ABSTRACT

The present technology relates to distributed computerized exchange systems for trading of financial instruments. In particular it relates to a passive matching engine and an active matching engine that cooperates in handling data messages such that less bandwidth is used and so that improvement in latency can be achieved.

20 Claims, 7 Drawing Sheets

(56) References Cited

OTHER PUBLICATIONS

Saito Y. et al; "Optimistic replication "MicrosoftInternet Articlevol. Microsoft Technical Report, Sep. 2003, XP002598309, URL:http://research.microsoft.com/pubs/66979/tr-2003-60.pdf.
"6.5.3 Cache-Coherence Protocols" In: Tanenbaum A.S. et al; "Distributed systems" 2002, XP002598310 ISBN: 0-13-121786-0, pp. 345-346.
Dubé, A-J. et al; "Oracle® Application Server TopLink Application, Developer's Guide "OracleInternet Articlevol. 10g Release 2 (10. 1.2), Apr. 2005, pp. 5-21-5-22, XP002598311, URL: http://download.oracle.com/docs/cd/B14099_19/web.1012/b15901.pdf.

\* cited by examiner

| Session state | Start time | Primary matching site |
|---|---|---|
| OPEN-AS | 17:30 | P2 |
| OPEN-EU | 24:00 | P3 |
| OPEN-US | 06:00 | P1 |

# 24 HOURS GLOBAL LOW LATENCY COMPUTERIZED EXCHANGE SYSTEM

This application claims priority to U.S. Provisional Application No. 61/221,302 filed Jun. 29, 2009, the entire contents of which is hereby incorporated by reference.

FIELD OF THE TECHNOLOGY

The present technology relates to a system and method for 24 hours global trading of financial instruments. In particular it relates to distributed computerized exchange systems and methods therefor.

BACKGROUND

Traditional exchange systems have primarily been running local businesses offering trading for clients located within the same region as the exchange system. However, the introduction of electronic market places as well as new alternative market places has changed the trading landscape. A market place doesn't have to be local anymore.

A general trend in many electronic market places is therefore to offer a global business. A trader can connect to a trading system from anywhere on the globe.

Together with the global offering comes also a need for extended trading hours. As a result of this some market places are today offering 24 h trading of the same financial instruments such as stocks bonds foreign exchange (FX) etc. It is common for these types of markets to have a trading activity that "follows the sun". This means that most orders that are sent in to an instrument during a specific part of the 24-hour period come from the location of the sun at that time. However orders may be sent from other locations on earth which are outside of the "normal" trading hours. For example Asian traders send in orders during Asian hours while EU traders send in orders during the EU hours and so forth. An example of such a system is disclosed in the U.S. Pat. No. 6,983,259. However during Asian hours EU traders may also send in orders.

A general problem with distributed exchange systems is latency and bandwidth. Minimizing latency and bandwidth has become more and more important aspects of computerized exchange systems, especially with the introduction of algorithmic traders. A primary root cause to latency is the distance between the actual central matching engine and the connecting parties.

For a computerized exchange system that offers 24*h* trading with global access this fact becomes a problem since the matching engine normally has one physical location.

A further problem associated with existing systems is the massive amount of information that is created and which needs to be distributed to all participants in the distributed system; this causes bandwidth problems in the systems.

BRIEF DESCRIPTION

It is an object of the present technology to provide a solution for improving bandwidth usage in a distributed computerized exchange system.

It is another object of the present technology to provide a solution for minimizing latency in a distributed computerized exchange system.

It is another object of the present technology to provide a solution that utilizes system resources in a more efficient way.

At least one of the above objects is achieved by the method and device as set out in the appended claims. Thus, a computerized method is provided for improving bandwidth utilization and minimizing latency in a distributed trading system comprising: a passive matching engine for matching orders, the passive matching engine being connectable to a first group of computerized trading terminals for sending in order entry messages to the passive matching engine, an active matching engine for matching orders, the active matching engine being connectable to a second group of computerized trading terminals for sending in order entry messages to the active matching engine, the method comprising the steps of: at the passive matching engine receiving an order entry message, adding status data to the order entry message and forwarding the order entry message to the active matching engine, processing the order entry message at the passive matching engine in order to create broadcast data, sending confirmation data from the active matching engine to the passive matching engine upon receiving the order entry message comprising the status data, sending out the broadcast data from the passive matching engine to the first group of computerized trading terminals upon receiving the confirmation data from the active matching engine.

Hereby the use of bandwidth within the system is reduced by utilizing the passive matching engine in order to create broadcast data while waiting for the active matching engine to send back an acknowledgment that the passive matching engine can distribute the broadcast messages. Thereby only one message each way needs to be sent between the passive and active matching engines.

Furthermore by processing the order entry message in the passive matching engine, improvement in latency with the clients connected to the passive matching engine can be achieved since the output data can be sent earlier.

Furthermore the processing of the order entry at the passive matching engine can be executed directly after the order entry message has been forwarded to the active matching engine. Thereby the passive matching engine is ready to directly distribute the broadcast messages when the confirmation data message sent from the active matching engine is received by the passive matching engine.

In the active matching engine a step of comparing the status data sent from the passive matching engine with a current status of the active matching engine can be executed. This is because the two matching engines may be in different states. The passive matching engine usually lags behind the active matching engine. Thus the passive matching engine adds status data that describes which status the passive matching engine belongs to, this is forwarded to the active matching engine together with the order entry message. When the order entry message arrives at the active matching engine the active matching engine either checks its own status with the status received in the order entry message and if it is the same status it sends back a positive acknowledgement if not it sends back its own current status data to the passive matching engine.

In another embodiment the active matching engine may send it own current status data and in this embodiment no comparison is necessary at the active matching engine. Instead the passive matching engine may check what it received back. If it received the same status data that it sent it can continue by starting dissemination of the broadcast data. If it receives a new status data it may start a rollback step.

The method can further comprise a rollback step wherein rolling back changes in the passive matching engine is performed if the confirmation data comprises a different status data compared to the status data added by the passive matching engine. Preferably the rollback step means that the orderbook in the passive matching engine is rolled back to the status it was before and then the processing of the order entry message can continue in the new status mode sent from the active matching engine.

In one embodiment after a rollback step have been executed at the passive matching engine it preferably continues processing the order entry message at the passive matching engine in order to create broadcast data, after the rollback step.

In accordance with a second aspect a computerized distributed trading system is provided, the system comprising: a passive matching engine for matching orders comprising a passive orderbook, the passive matching engine being connectable to a first group of computerized trading terminals for sending in order entry messages to the passive matching engine, an active matching engine for matching orders comprising a active orderbook, the active matching engine being connectable to a second group of computerized trading terminals for sending in order entry messages to the active matching engine, the passive matching engine being configured to receive order entry messages from the first group of computerized trading terminals, adding a status data to the order entry message, forwarding the order entry message to the active matching engine, processing the order entry message in order to create broadcast data, sending out the broadcast data to the first group of computerized trading terminals upon receiving confirmation data from the active matching engine.

Hereby the use of bandwidth within the system is reduced by utilizing the passive matching engine in order to create broadcast data while waiting for the active matching engine to send back an acknowledgment that the passive matching engine can distribute the broadcast messages. Thereby only one message each way needs to be sent between the passive and active matching engines.

Furthermore by processing the order entry message in the passive matching engine, improvement in latency with the clients connected to the passive matching engine can be achieved since the output data can be sent earlier.

Furthermore the computerized distribute trading system can comprise a second passive matching engine for matching orders comprising a second passive orderbook, the second passive matching engine being connectable to a third group of computerized trading terminals for sending in order entry messages to the second passive matching engine. Thus the method mentioned above can also be used in the context of two or more passive matching engines and one active matching engine.

The passive matching engine may further be configured to rollback changes in the passive orderbook if the confirmation data comprises a different status data compared to the status added by the passive matching engine.

The passive matching engine is preferably configured to process the order entry message at the passive matching engine in order to create broadcast data, after the rollback.

Preferably the active matching engine is configured to process the order entry message upon receiving the order entry message from the passive matching engine in order to create broadcast data, and sending the broadcast data to the second group of computerized trading terminals. Hereby the passive and active matching engine distributes information to their own groups of computerized trading terminals and bandwidth can be saved.

These and other aspects of the technology will be apparent from and elucidated with reference to the embodiments described hereinafter.

DESCRIPTION OF PREFERRED EMBODIMENTS

Figure 1:
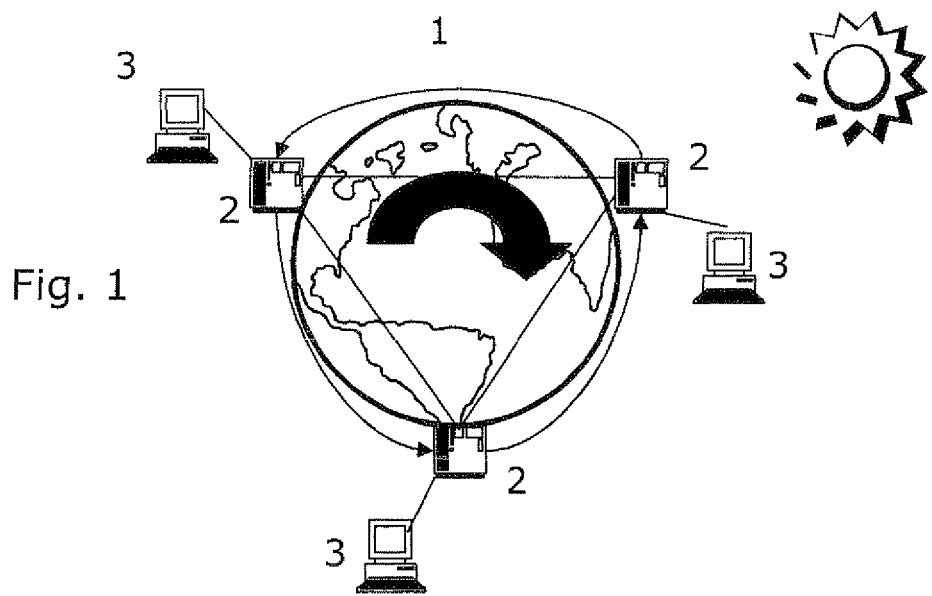
FIG. 1 illustrates a globally distributed computerized exchange systems.

The present technology will now be described in more detail by way of non-limiting examples and with reference to the accompanying drawings. FIG. 1 illustrates an exemplary globally distributed computerized exchange system 1 in which the present technology can be used. The distributed exchange system 1 comprises three computerized exchange systems 2 and three groups of computerized trading terminals 3 illustrated by a single computer in the figure. Each computerized exchange system 2 comprises a matching engine and all necessary subsystems that computerized exchange systems usually comprise. Example of subsystems can be information dissemination subsystem, a common database, deal capture subsystem and so forth.

Figure 2:
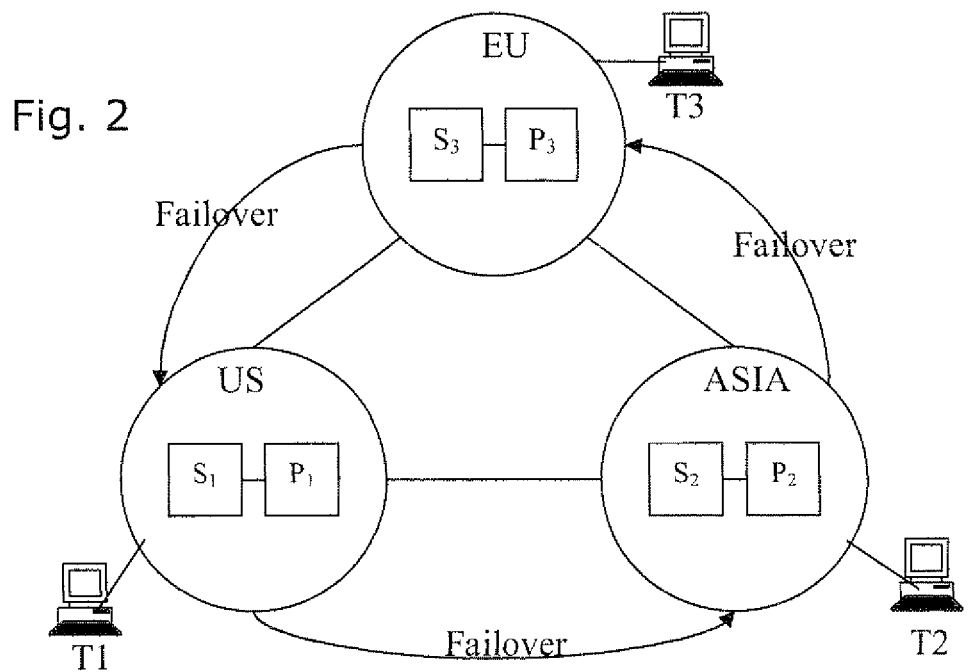
FIG. 2 illustrates a distributed computerized exchange system comprising a secondary and primary matching engine at each site.

FIG. 2 illustrates a distributed computerized exchange system comprising a secondary and primary matching engine at each site EU, US and ASIA. To each site a group of computerized trading terminals are connected T1, T2 and T3. The system can be configured such that failover can occur between the sites as illustrated in the figure. However since each site comprises a primary and secondary matching engine the failover of the matching engine can stay within each site. Thus the critical matching processes may failover within the site whereas less critical functions and processes can failover between the sites. For example the information dissemination subsystem can failover to another site if that subsystem would fail.

Figure 3:
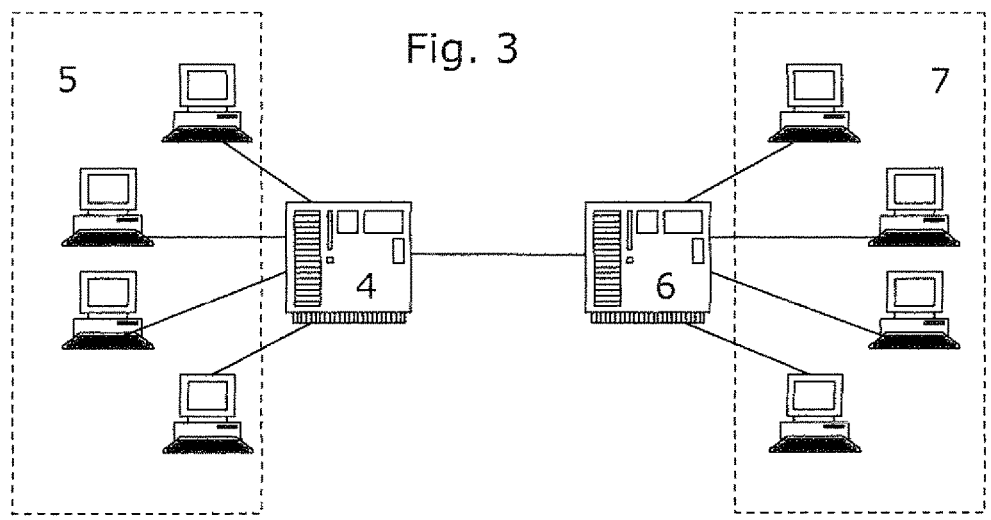
FIG. 3 illustrates a passive matching engine connected to a group of trading terminals and an active matching engine connected to another group of trading terminals.

FIG. 3 illustrates a passive matching engine 4 connected to a first group of computerized trading terminals 5 and an active matching engine 6 connected to a second group of trading terminals 6. The passive and active matching engines being connected with each other via a high speed connection comprising for example optical fibres, such as black fibres, and other network devices. Furthermore a second passive matching engine (not shown) could be connected to the active matching engine 6 and also connected to the passive matching engine 4. The matching engines 4 and 6 are preferably part of a computerized exchange system comprising a number of additional subsystems as mentioned above.

Figure 4:
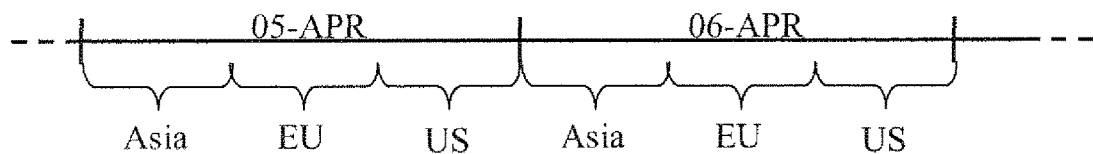
FIG. 4 illustrates how a 24 hours day can be divided between different sites.

FIG. 4 illustrates how a 24 hour day can be divided into three different trading sessions wherein the active trading session is moved between the different sites ASIA, EU and US according to the figure.

Figures 5, 6:
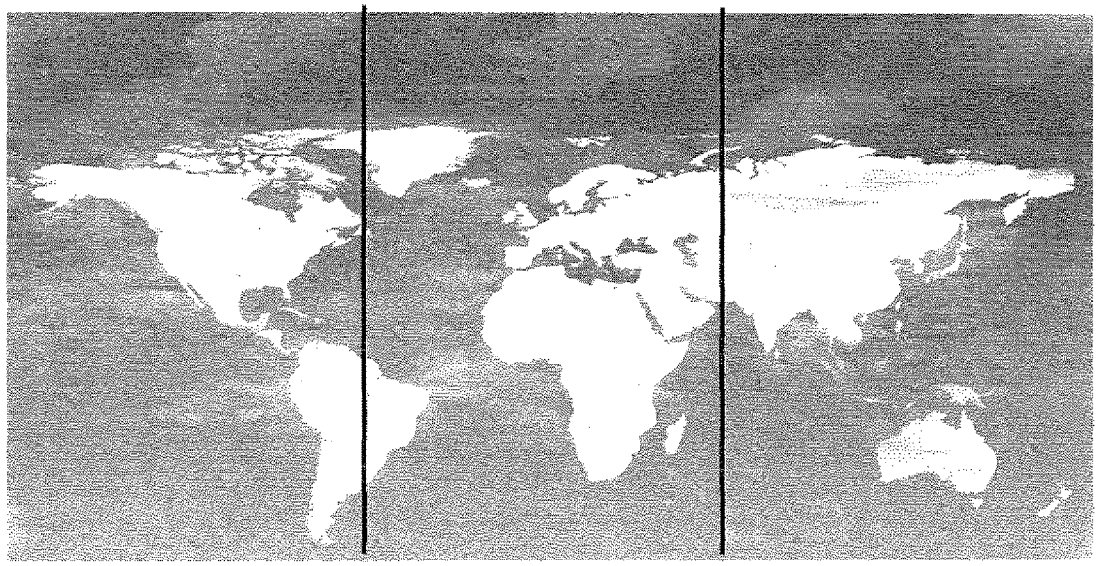
FIG. 5 illustrates the world divided into three time zones.
FIG. 6 illustrates a table showing start time of the different time zones.

FIG. 5 illustrates a world map wherein the world is divided into three different time zones similar to FIG. 4.

FIG. 6 illustrates a time table showing when each site should start trading, i.e. when the active session should be moved over to the next site.

Figure 7:
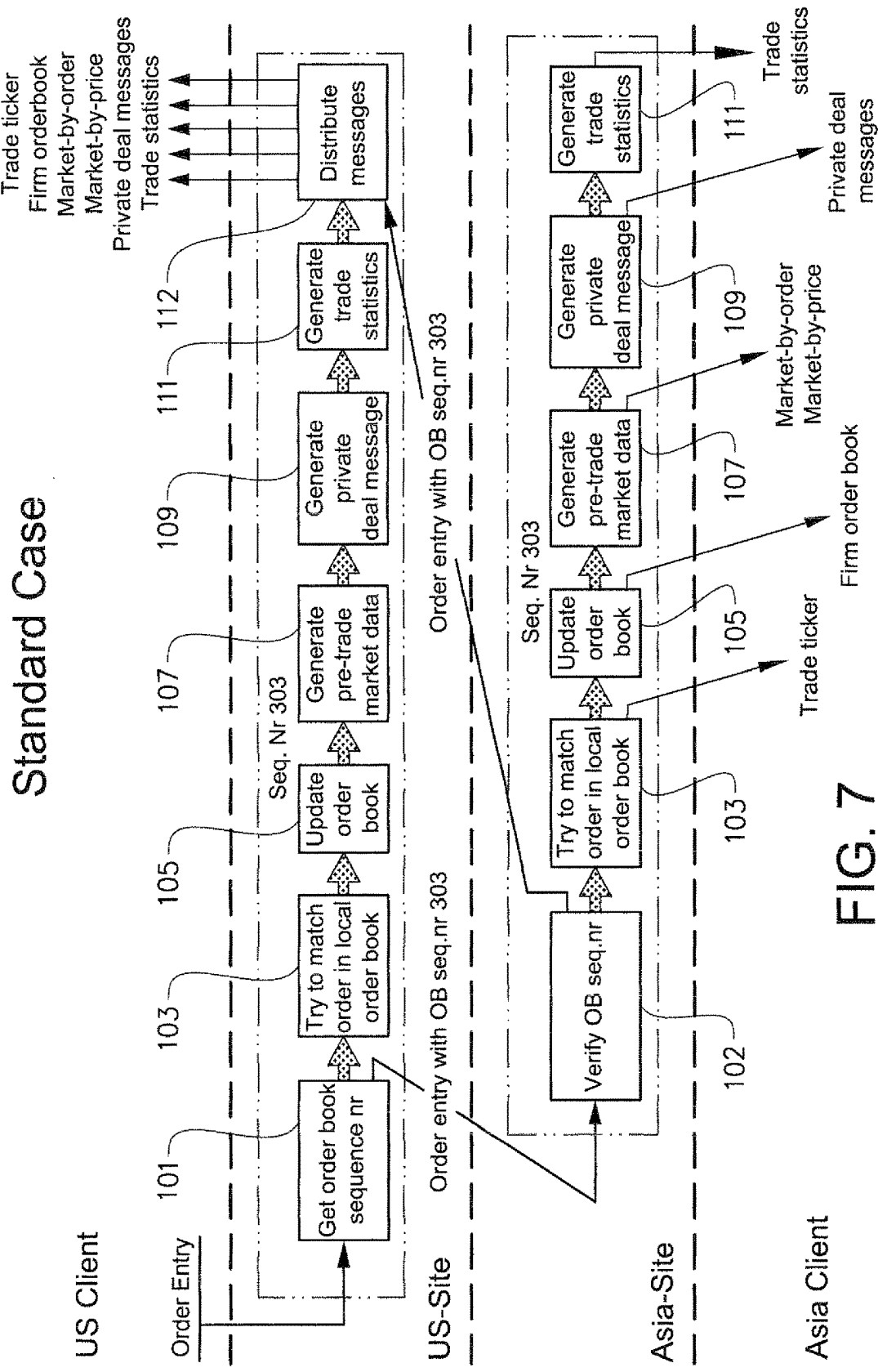
FIG. 7 illustrates message transactions between the active and passive matching engines.

FIG. 7 shows an example of the present technology when the session states are the same at the passive and active matching engine. The Figure illustrates some steps that can be performed in a response to an order entry. First in a step 101 an order book (OB) sequence number is obtained. If the order entry is received from a passive Site, the order book sequence number is verified in a step 102, see below. It is illustrated how the order entry message is sent from the passive site (US-site) to the active site (Asia-Site) and that the passive site starts processing the order entry message as soon as it has been sent to the active site.

The order entry then tries to match in the local orderbook, step 103. Next, the orderbook is updated in a step 105. Thereupon pre-trade market data is generated in a step 107. Then a private deal message is generated in a step 109, Next trade statistics are generated in a step 111.

When the active site receives the order entry message comprising the status data for example as an order entry associated with an Orderbook (OB) sequence number, it sends a message back to the passive site so that the passive site can start distributing data to its clients, step 112. Meanwhile the active site starts to process the order entry message and also starts distribute information to its clients as illustrated by the arrows.

Figure 8:
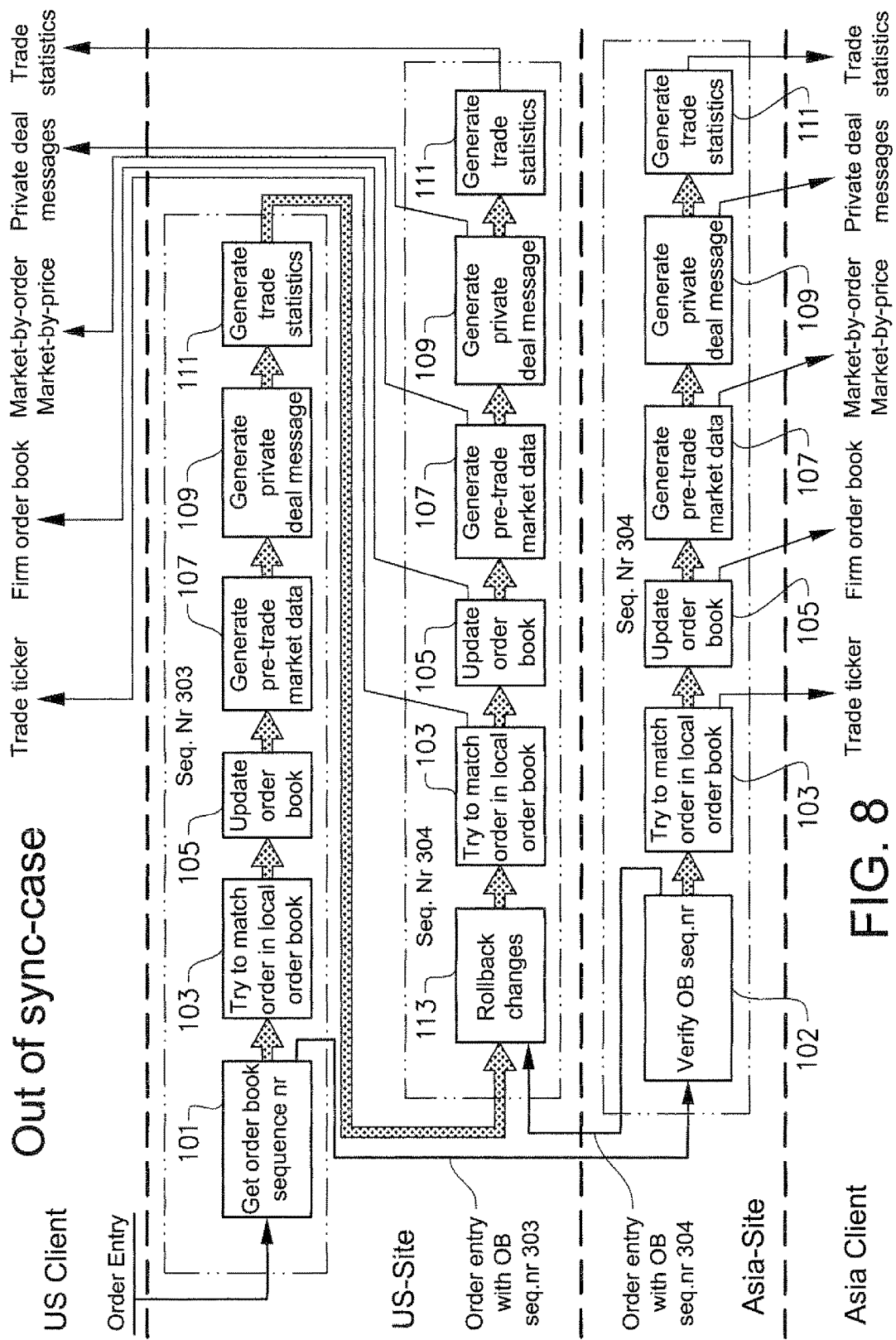
FIG. 8 illustrates message transactions and processing when the matching engines are not synchronized.

FIG. 8 shows an example of the present technology using the same reference numbers as in FIG. 7 for the same process steps when the session states differ between the passive and active matching engine. Similar to FIG. 7 it is illustrated how the passive site forwards the order entry message updated with the status data and that it starts processing the order entry data. However since the active matching engine have another sequence number (is in a different state) the passive receives a message that indicates this difference and the passive matching engine instead executes a rollback process in a step 113 in order to change the orderbook to its original status or actually to a status according to the sequence number that it received from the active matching engine. When the orderbook is in this status that corresponds to the status of the active matching engine the passive matching engine starts processing the order entry message again in order to create output data that it can distribute to its clients, in this example to US Clients.

Figure 9:
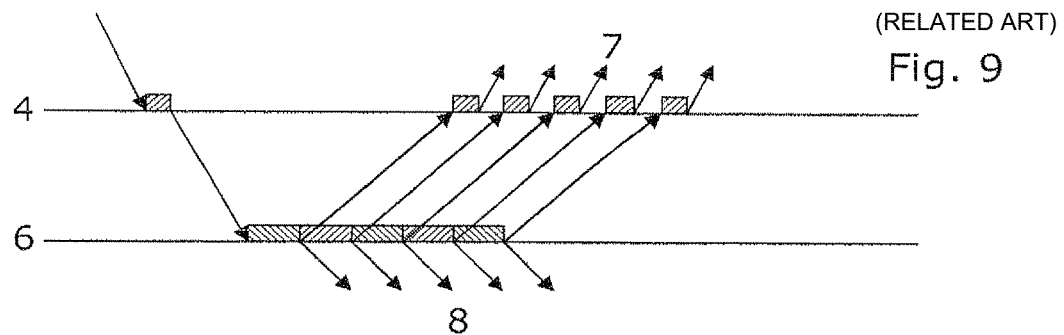
FIG. 9 illustrates a prior art solution where all messages are sent from the active site.

FIG. 9 shows a prior art system wherein the order entry message is only processed at the active matching engine 6 and the output data is sent from the active matching engine 6 to the passive matching engine 4 and then to the clients 7 connected to the passive matching engine. The output data is also sent to the clients 8 connected to the active matching engine.

Figure 10:
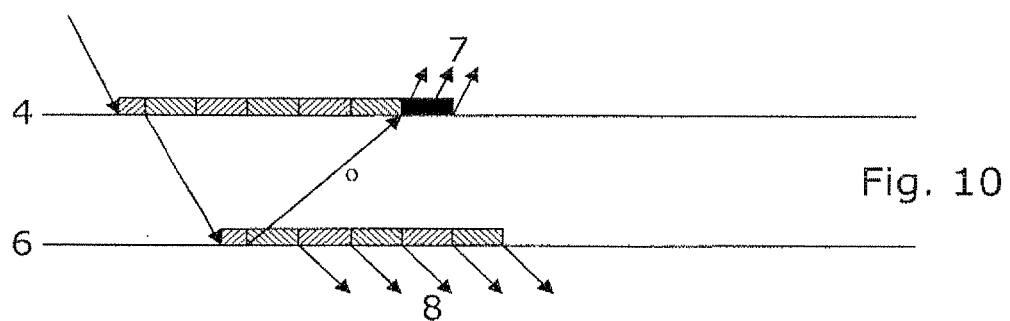
FIG. 10 illustrates the same situation as FIG. 7.

FIG. 10 shows a situation similar to the one illustrated in FIG. 7. Here it can be seen that the passive matching engine 4 is used to create output data and that when the passive matching engine 4 receives a message from the active matching engine 6 it starts distributing the output data to its clients 7 connected to the passive matching engine.

Figure 11:
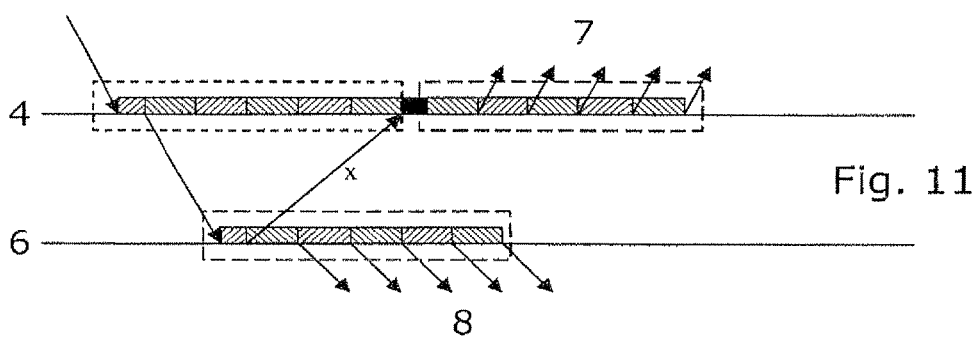
FIG. 11 illustrates the same situation as FIG. 8.

FIG. 11 shows a situation similar to the one illustrated in FIG. 8, when the passive and active matching engines are out of sync.

Figure 12:
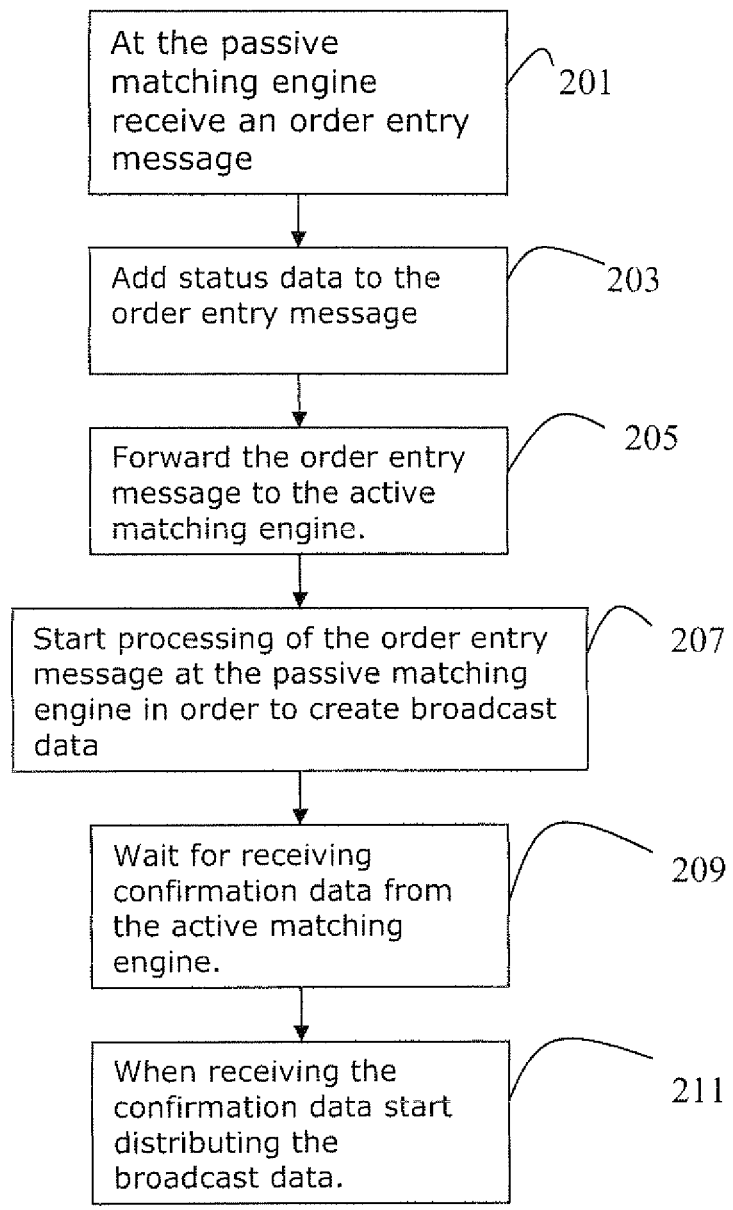
FIG. 12 illustrates an embodiment of computerized method according to the invention.

FIG. 12 illustrates the steps of a computer implemented method according to an embodiment of the present technology. The method is preferably implemented by computer readable code storable on a memory and executable by a computer processor. In accordance with the method the following procedural steps can be performed. First, in a step 201, an order entry message is received at a site associated with a passive matching engine. Next, in a step 203 status data is added to the received order entry message received in step 201. The order entry message is then forwarded to a site associated with an active matching engine in a step 205. The order entry received at the passive site is then processed at the passive site to generate and create broadcast data in a step 207. Next the passive site waits for confirmation from the site associated with the active matching engine in a step 209. Upon reception of such a confirmation the generated broadcast data generated in step 207 is distributed in a step 211.

In the above description the term "comprising" does not exclude other elements or steps and "a" or "an" does not exclude a plurality.

Furthermore the terms "include" and "contain" does not exclude other elements or steps.

The invention claimed is:

1. A computerized method for transmitting broadcast data in a computerized distributed trading system, the method comprising:
    receiving, by a passive matching engine of a first computerized exchange system, an order entry message from a first trader terminal of a first group of computerized trading terminals connected to the passive matching engine of the first computerized exchange system;
    creating, by the passive machine engine, a modified order entry message by adding status data, including at least a sequence number related to an order, and relating to an operating state of the passive matching engine to the received order entry message;
    forwarding the modified order entry message, including the sequence number, to an active matching engine of a second computerized exchange system for matching;
    creating, by the passive matching engine, broadcast data by processing the received order entry message;
    generating, by the active matching engine, confirmation data by comparing an operation state of the active matching engine to the operating state of the passive matching engine based on at least the sequence number included in the modified order entry message;
    transmitting the confirmation data from the active matching engine to the passive matching engine upon receiving the modified order entry message comprising the status data;
    receiving, by the passive matching engine, the confirmation data from the active matching engine; and
    transmitting, by the passive matching engine, the broadcast data to the first group of computerized trading terminals when the received confirmation data comprises an acknowledgement of the status data.

2. The computerized method according to claim 1, further comprising:

creating, by the active matching engine, a second broadcast data on receiving the modified data message by processing the received modified data message, and transmitting, by the active matching engine, the second broadcast data to a second group of computerized trading terminals connected to the active matching engine.

3. The computerized method according to claim 1, further comprising:

comparing, by the active matching engine, the status data in the modified order entry message with a current status data relating to the operating state of the active matching engine, and creating, by the active matching engine, confirmation data.

4. The computerized method according to claim 3, wherein the confirmation data includes an acknowledgment when the received status data equals the current status data.

5. The computerized method according to claim 3, wherein the confirmation data includes the current status data when the received status data does not equal the current status data.

6. The computerized method according to claim 1, further comprising:

modifying, when the received confirmation data comprises current status data, the operating state of the passive matching engine to an operating state indicated by the current status data, creating, by the passive matching engine operating in the modified operating state, modified broadcast data by processing the received data message, and transmitting, by the passive matching engine, the modified broadcast data to the first group of computerized trading terminals.

7. A computerized distributed trading system, comprising:

a first computerized exchange system having at least one processor and comprising a passive matching engine for receiving orders comprising a passive orderbook, the passive matching engine being connectable to a first group of computerized trading terminals for transmitting order entry messages to the passive matching engine;

a second computerized exchange system having at least one processor and comprising an active matching engine for matching orders comprising an active orderbook, the active matching engine being connectable to a second group of computerized trading terminals for transmitting order entry messages to the active matching engine;

wherein the passive matching engine is configured to:
receive an order entry message from a first trading terminal of the first group of computerized trading terminals;

create a modified order entry message by adding status data, including at least a sequence number related to an order, and relating to an operating state of the passive matching engine to the received order entry message;

forward the modified order entry message, including the sequence number, to the active matching engine for matching;

create broadcast data by processing the received order entry message;

receive confirmation data from the active matching engine;

transmit the broadcast data to the first group of computerized trading terminals when the received confirmation data comprises an acknowledgement of the status data; and wherein the active matching engine is configured to:
generate confirmation data by comparing an operation state of the active matching engine to the operating state of the passive matching engine based on at least the sequence number included in the modified order entry message;

transmit the confirmation data message to the passive matching engine upon receiving the modified data message.

8. The computerized distributed trading system according to claim 7, wherein the active matching engine is further configured to perform functionality comprising:

create a second broadcast data, upon receiving the modified data message from the passive matching engine, by processing the modified order entry message, and transmit the second broadcast data to the second group of computerized trading terminals.

9. The computerized distributed trading system according to claim 7, wherein the active matching engine is further configured to perform functionality comprising:

compare the status data in the received modified data message with current status data relating to the operating state of the active matching engine, and transmit a confirmation data message to the passive matching engine on receiving the modified data message.

10. The computerized distributed trading system according to claim 9, wherein the active matching engine is further configured to perform functionality comprising add an acknowledgment to the confirmation data message when the received status data equals the current status data.

11. The computerized distributed trading system according to claim 9, wherein the active matching engine is further configured to perform functionality comprising add the current status data to the confirmation data message when the received status data does not equal the current status data.

12. The computerized distributed trading system according to claim 7, wherein the passive matching engine is further configured to perform functionality comprising:

modify the operating state of the passive matching engine to an operating state related to current status data comprised in the received confirmation data, create modified broadcast data by processing the received data message, and transmit the broadcast data to the first group of computerized trading terminals when the received confirmation data message comprises current status data.

13. The computerized method according to claim 1, further comprising:

processing order data before the confirmation data is received from the active matching engine of the second computerized exchange system; and modifying the processed order data to correspond to changes necessitated as a result of the received confirmation data.

14. The computerized distributed trading system according to claim 7, wherein:

the first computerized exchange system is configured to process order data before the confirmation data is received from the active matching engine of the second computerized exchange system, and the first computerized exchange system is configured to modify the processed order data to correspond to changes necessitated as a result of the received confirmation data.

15. A computerized exchange system comprising at least one processor and a passive matching engine configured to receive orders in a passive orderbook, the passive matching engine configured to connect to a first group of computerized trading terminals for transmitting order entry messages to the passive matching engine, the passive matching engine configured to:
receive an order entry message from a first trading terminal of the first group of computerized trading terminals;
create a modified order entry message by adding status data, including at least a sequence number related to an order, and relating to an operating state of the passive matching engine to the received order entry message;
forward the modified order entry message, including the sequence number, to an active matching engine for matching;
create broadcast data by processing the received order entry message;
receive confirmation data from the active matching engine, the confirmation data being generated by comparing an operation state of the active matching engine to the operating state of the passive matching engine based on at least the sequence number included in the modified order entry message; and
transmit the broadcast data to the first group of computerized trading terminals when the received confirmation data comprises an acknowledgement of the status data.

16. The computerized method according to claim 1, wherein generating the confirmation data includes generating an indication to the passive matching engine to roll back changes made by the passive matching engine when the sequence number included in the modified order entry message does not correspond to the state of the active matching engine.

17. The computerized method according to claim 1, wherein the sequence number is an orderbook sequence number corresponding to the order.

18. The computerized method according to claim 1, wherein the sequence number is an orderbook sequence number corresponding to a status of the order stored in an orderbook.

19. The computerized method according to claim 1, wherein the status data relates to a status of an order book being accessed by the passive matching engine.

20. The computerized method according to claim 1, wherein the status data is indicative of a state of an orderbook accessed by the passive matching engine, the status data being used to compare the state of the orderbook accessed by the passive matching engine with a state of an orderbook accessed by the active matching engine.

* * * * *